United States Patent [19]
Kanazawa et al.

[11] 3,782,804
[45] Jan. 1, 1974

[54] HOLOGRAPHY USING MULTIPLE DIFFUSED OBJECT ILLUMINATION BEAMS

[75] Inventors: Yasunori Kanazawa; Yoshizumi Eto, both of Hachioji, Japan

[73] Assignee: Hitachi, Ltd., Tokyo, Japan

[22] Filed: Oct. 18, 1972

[21] Appl. No.: 298,568

[30] Foreign Application Priority Data
Oct. 18, 1971 Japan..........................46/81689

[52] U.S. Cl. .............................. 350/3.5, 350/162 R
[51] Int. Cl. ..................................... G02b 27/00
[58] Field of Search .................. 350/3.5, 162 SF, 350/162 R

[56] References Cited
UNITED STATES PATENTS

| | | | |
|---|---|---|---|
| 3,677,616 | 7/1972 | Lewis | 350/3.5 |
| 3,640,599 | 2/1972 | Van Lighten | 350/3.5 |
| 3,659,914 | 5/1972 | Brooks | 350/3.5 |
| 3,650,595 | 3/1972 | Gerritsen et al. | 350/3.5 |
| 3,490,827 | 1/1970 | Van Lighten et al. | 350/3.5 |

*Primary Examiner*—Ronald J. Stern
*Attorney*—Paul M. Craig, Jr. et al.

[57] ABSTRACT

A hologram recording apparatus comprises a diffraction grating which serves to convert an object light beam obtained from a single light source into a plurality of beams, and a diffuser which is arranged in the path of the multiple light, whereby an object is illuminated by light from said diffuser.

6 Claims, 3 Drawing Figures

HOLOGRAPHY USING MULTIPLE DIFFUSED OBJECT ILLUMINATION BEAMS

BACKGROUND OF THE INVENTION

The present invention relates to a hologram recording apparatus, and more particularly to an apparatus which, for recording images by the use of holography, enhances the signal-to-noise ratio without spoiling redundancy.

With respect to image recording with holography, several proposals have hertofore been made. However, there is not yet provided a system which is high in redundancy and which attains such good picture quality that the signal-to-noise ratio can sufficiently endure practical use. The high redundancy is necesary to prevent a lowering of the quality of reconstructed images due to, e.g., a flaw in the recording medium and is generally obtained by illuminating an object with light diffused by means of a light diffuser. The light diffuser is formed of an optically rough surface, so that so-called speckle noise is inevitably generated. Therefore, this has remarkably degraded the signal-to-noise ratio of a reconstructed image. On the other hand, in recording a digital pattern, utilization of a random phase shifter has been suggested as a means to obtain high redundancy. The suggestion, however, is not yet confirmed whether it can also be an effective means where general pictures are used as the object. As another means to obtain high redundancy a method has also been suggested in which a plurality of unit holograms made from photographs of an identical object are combined into one hologram, and reconstructed images of the respective unit holograms are superposed at reconstruction, whereby noise components are cancelled by utilizing the correlation of the reconstruction image as required. With this method, however, the quality of picture as can be put into practical use is not obtained in the present state of the art.

SUMMARY OF THE INVENTION

An object of the present invention is to provide a hologram recording apparatus by which a reconstructed image of hologram having a good signal-to-noise ratio is obtainable without deteriorating redundancy.

In order to accomplish such an object, the present invention makes a hologram using a diffraction grating which converts an object beam emergent from a single light source into a plurality of light beams, and a diffuser on which the beams from the diffraction grating are illuminated.

DESCRIPTION OF THE PREFERRED EMBODIMENTS

Figure 1:
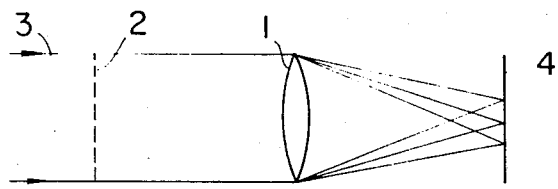
FIGS. 1 and 2 are schematic diagrams for explaining the principle of the present invention.

FIG. 1 is a diagram for explaining the function of a diffraction grating for use in a hologram composing apparatus according to the present invention.

Referring to the figure, numeral 1 designates a lens, 2 a diffraction grating arranged at the front focal plane of the lens 1, 3 parallel light fluxes from a lightsource (not shown), and 4 a screen arranged at the back focal plane of the lens 1.

In the case where the diffraction grating 2 is illuminated by the parallel light fluxes 3 with such a construction, a Fraunhofer diffraction pattern of the diffraction grating 2 is formed on the screen 4.

As is well known, it is the Fourier transform image of the grating 2, and provides a spacial frequency distribution of the grating 2. That is to say, light spots from light having been rectilinearly propagated through the grating 2 (the so-called O-th order light beam) and light spots of higher order terms determined by the spacial construction of the grating 2 appear on the screen 4. The number of light spots can be freely selected through the pitch of the grating 2 and the area ratio between the light blcoking or intercepting parts and the light transmitting parts thereof.

Figure 2:
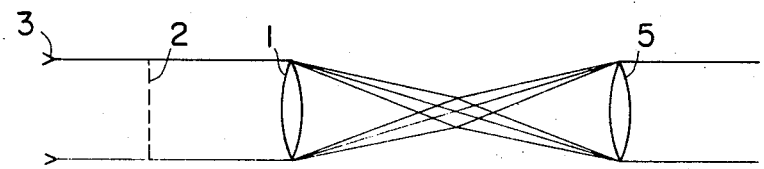

Now, the screen 4 in FIG. 1 is removed. As shown in FIG. 2, a lens 5 is arranged on the optical axis of the lens 1, so as to have a common focal point with the lens 1. A group of light spots are produced in such a way that the grating 2 undergoes a Fourier-transformation by the lens 1, and are further Fourier-transformed by the lens 5, and are converted into parallel plane waves again.

On the other hand, in the case where a diffuser, such as a ground glass plate scattering light at random, is inserted into the optical path of coherent light such as laser light, speckle noises arise at an image plane thereof. It is also known that, by virtue of its randomness, the diffuser is useful as means by which input information can be recorded with redundancy imparted thereto. During high-redundancy recording employing the diffuser, the speckle noises are unavoidably generated, to conspicuously lower the signal-to-noise ratio of pictures. The distribution of the speckle noises corresponds to the distribution of directions in which the light is scattered. If the position of the diffuser is moved within the optical path, the distributed state of the noises is also changed. Accordingly, if diffusers differing in the distribution of scattering directions from one another are arranged for the respective light fluxes of the light spots occurring between the lens 1 and the lens 5 in FIG. 2, a light beam after passage through the lens 5 becomes a beam with the light rays of the distributions of the speckle noises superposed on one another. If, in place of such a plurality of diffusers, a single diffuser extending over all the light spots is used, the same result can be obtained, since the distributed state of light on the diffuser varies in dependence on the location.

Thus, the use of the diffuser leads to the same result as that of superposition of the same N pictures differing in the noise distrubution. Therefore, in conformity with the idea of so-called synchronized addition, the noise component increases in proportion to $\sqrt{N}$, whereas the signal component increases in proportion to N. The signal-to-noise ratio is accordingly improved at a rate of $\sqrt{N}$.

Figure 3:
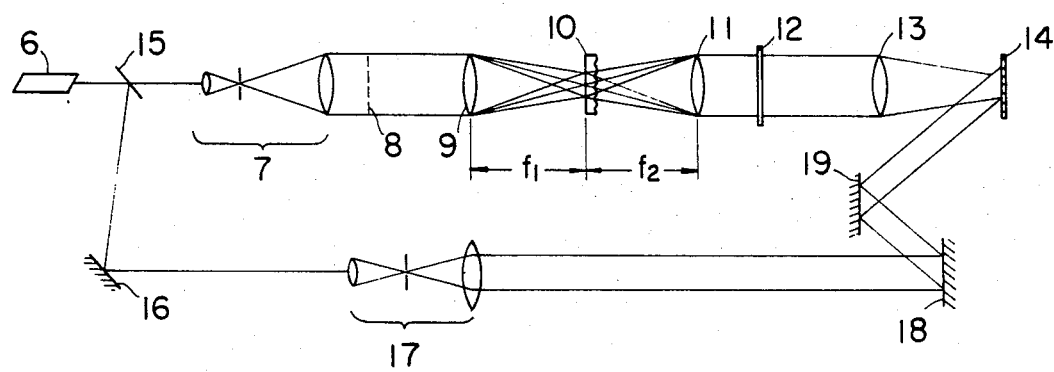
FIG. 3 is a schematic presentation of an embodiment of the present invention.

FIG. 3 is a diagram showing the construction of an embodiment of a hologram making apparatus according to the present invention and including a diffraction grating and a diffuser. Referring to the figure, numeral 6 indicates a light source such as laser, 7 a collimator lens system, 8 diffraction grating, 9 a lens, 10 a diffuser, 11 a lens, 12 an object, 13 a lens, and 14 a screen. Numeral 15 represents a beam splitter which is arranged between the light source 6 and the collimator lens system 7, 16 a reflector which reflects a light beam from the beam splitter 15, 17 a beam splitter, and 18 and 19 reflectors.

In such an arrangement, coherent light emerging from the light source 6 is split into an object light beam and a reference light beam by the beam splitter 15. The object light beam is converted by the collimator lens system 7 into parallel plane waves with the light beam diameter expanded.

The diffraction grating 8 located in the light path of the parallel plane waves has its diffraction pattern produced by the lens 9. Thus, the light beam having emerged from the single light source is converted into a plurality of light beams. The diffuser 10 is arranged, as shown in the figure, for the plurality of light beams obtained in this way. Then, the light sources include speckle noises of respectively different distributions.

Accordingly, where the light fluxes are again made parallel light rays by the lens 11 to illuminate the object 12, the speckle noises are averaged on the plane of the object 12 for the reason stated above, and the object is illuminated by the light with only slight noise components. In order to obtain a Fourier transform hologram, an image of the object 12 is subjected to Fourier transform by the lens 13, and the images is focused on the photographic emulsion 14. In this case, in order to obtain the reference light beam, the light beam split by the beam splitter 15 has its optical path changed by the mirror 16, the beam diameter is magnified by the collimator lens system 17 and further, the optical path is adjusted by the mirrors 18 and 19, so as to cause the light beam to reach the photographic emulsion 14. Although the lens 9 and the lens 11 need be disposed at common focal positions as shown in FIG. 3, the diffuser 10 need not be always arranged at a focal position. Rather, better results have been experimentally produced by disposing the diffuser at positions other than a focus.

As described above, according to the present invention, the correlation of a required image is obtained with simple optical means, and the noise component can be suppressed. Accordingly, with only slight modifications on hitherto-known hologram composing systems, the signal-to-noise ratio of reconstructed images can be enhanced without spoiling the redundancy of holograms.

We claim:

1. An apparatus for making Fourier transfer holograms comprising:
   first means for providing first and second beams of coherent energy;
   second means, disposed in the path of said first beam of energy, for converting said first beam into a plurality of diffracted energy beams and for spatially separating each of said plurality of diffracted beams from the other of said plurality of diffracted beams;
   third means, disposed in the path of said diffracted energy beams at a location where said beams are spatially separated, for scattering said diffracted energy beams;
   fourth means, disposed in the path of said scattered energy beams, for collimating said scattered energy beams and directing said collimated scattered beams upon an object; and
   fifth means, disposed in the path of said second energy beam and the beams directed toward said object, for forming a hologram of said object with a substantially increased signal-to-noise ratio.

2. An apparatus according to claim 1, wherein said energy is light, said second means comprises a transparent diffraction grating and a first lens displaced with respect to said grating to receive said plurality of said diffracted energy beams, and wherein said fourth means comprises a first collimating lens, a focal point of which is coincident with a focal point of said first lens.

3. An apparatus according to claim 2, wherein said third means comprises a diffuser disposed between said first lens and said first collimating lens displaced with respect to the coincident focal points thereof.

4. An apparatus according to claim 3, wherein said second means comprises a first beam expander and a second collimating lens for directing an expanded collimated beam onto said diffraction grating, and further including a second beam expander and a third collimating lens disposed in the path of said second beam.

5. An apparatus according to claim 2, wherein said third means comprises a diffuser disposed between said first lens and said first collimating lens at the coincident focal points thereof.

6. An apparatus according to claim 5, wherein said second means comprises a first beam expander and a second collimating lens for directing an expanded collimated beam onto said diffraction grating, and further including a second beam expander and a third collimating lens disposed in the path of said second beam.

* * * * *